(12) United States Patent
Kain

(10) Patent No.: US 6,554,358 B2
(45) Date of Patent: Apr. 29, 2003

(54) INFANT VEHICLE SEAT WITH TILTABLE BASE

(75) Inventor: James M. Kain, Troy, OH (US)

(73) Assignee: Cosco Management, Inc., Wilmington, DE (US)

( * ) Notice: Subject to any disclaimer, the term of this patent is extended or adjusted under 35 U.S.C. 154(b) by 127 days.

(21) Appl. No.: 09/751,107

(22) Filed: Dec. 29, 2000

(65) Prior Publication Data

US 2002/0084680 A1 Jul. 4, 2002

Related U.S. Application Data

(60) Provisional application No. 60/234,541, filed on Sep. 22, 2000.

(51) Int. Cl.⁷ ................................................ B60N 2/24
(52) U.S. Cl. ............................. 297/256.13; 297/256.16
(58) Field of Search ...................... 797/256.13, 256.14

(56) References Cited

U.S. PATENT DOCUMENTS

| 4,345,791 A | 8/1982 | Bryans et al. |
| 4,634,177 A | 1/1987 | Meeker |
| 4,733,909 A | 3/1988 | Single, II et al. |
| 4,754,999 A | 7/1988 | Kain |
| 4,943,113 A | 7/1990 | Meeker |
| 5,115,523 A | 5/1992 | Cone |
| 5,181,761 A * | 1/1993 | Meeker .................. 297/256.13 |
| 5,277,472 A | 1/1994 | Freese et al. |
| 5,413,401 A | 5/1995 | Koyanagi |
| 5,567,008 A | 10/1996 | Cone, II |
| 5,833,314 A | 11/1998 | Mitschelen et al. |
| 6,017,088 A * | 1/2000 | Stephens et al. ............... 292/50 |
| 6,033,019 A | 3/2000 | Hession-Kunz et al. |
| 6,139,101 A * | 10/2000 | Berringer et al. ..... 297/256.1 X |
| 6,170,911 B1 | 1/2001 | Kassai et al. |
| 6,196,629 B1 * | 3/2001 | Onishi et al. .......... 297/256.12 |
| 6,299,249 B1 | 10/2001 | Mori |

* cited by examiner

Primary Examiner—Anthony D. Barfield
(74) Attorney, Agent, or Firm—Barnes & Thornburg

(57) ABSTRACT

A tiltable base is adapted to rest on a vehicle seat and support a juvenile vehicle seat in a desired position with respect to the underlying vehicle seat. The base includes a support foundation, a seat support movable relative to the support foundation, and a retainer configured to retain the seat support in selected positions relative to the support foundation and to release the seat support for movement relative to the support foundation.

44 Claims, 10 Drawing Sheets

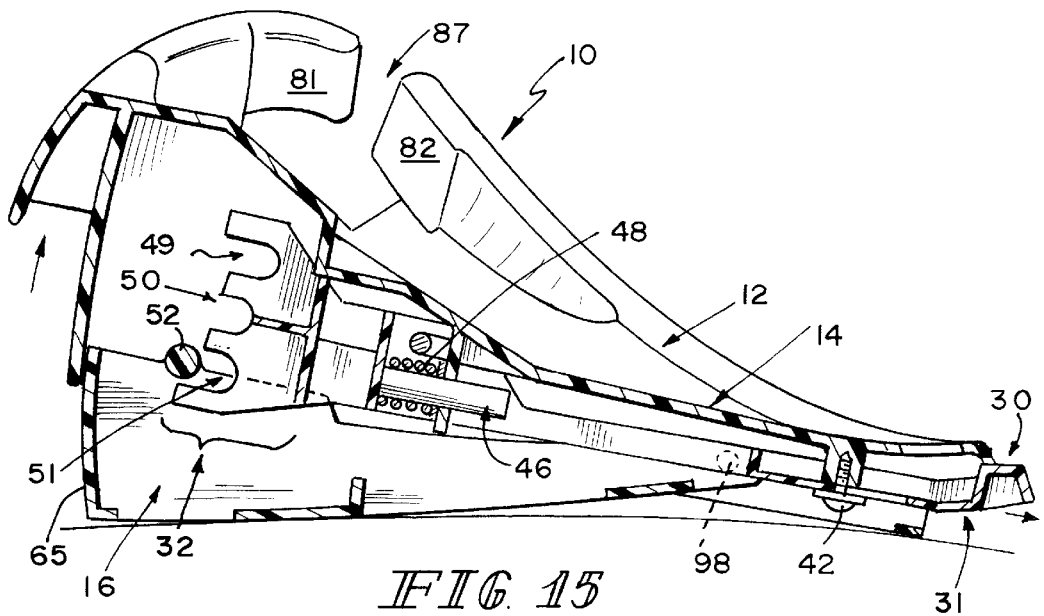
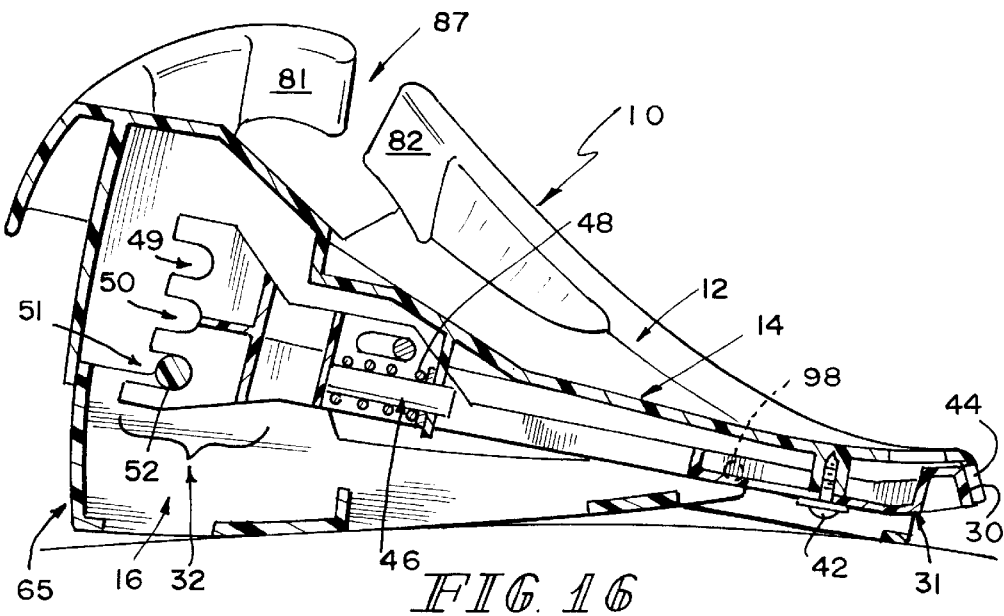

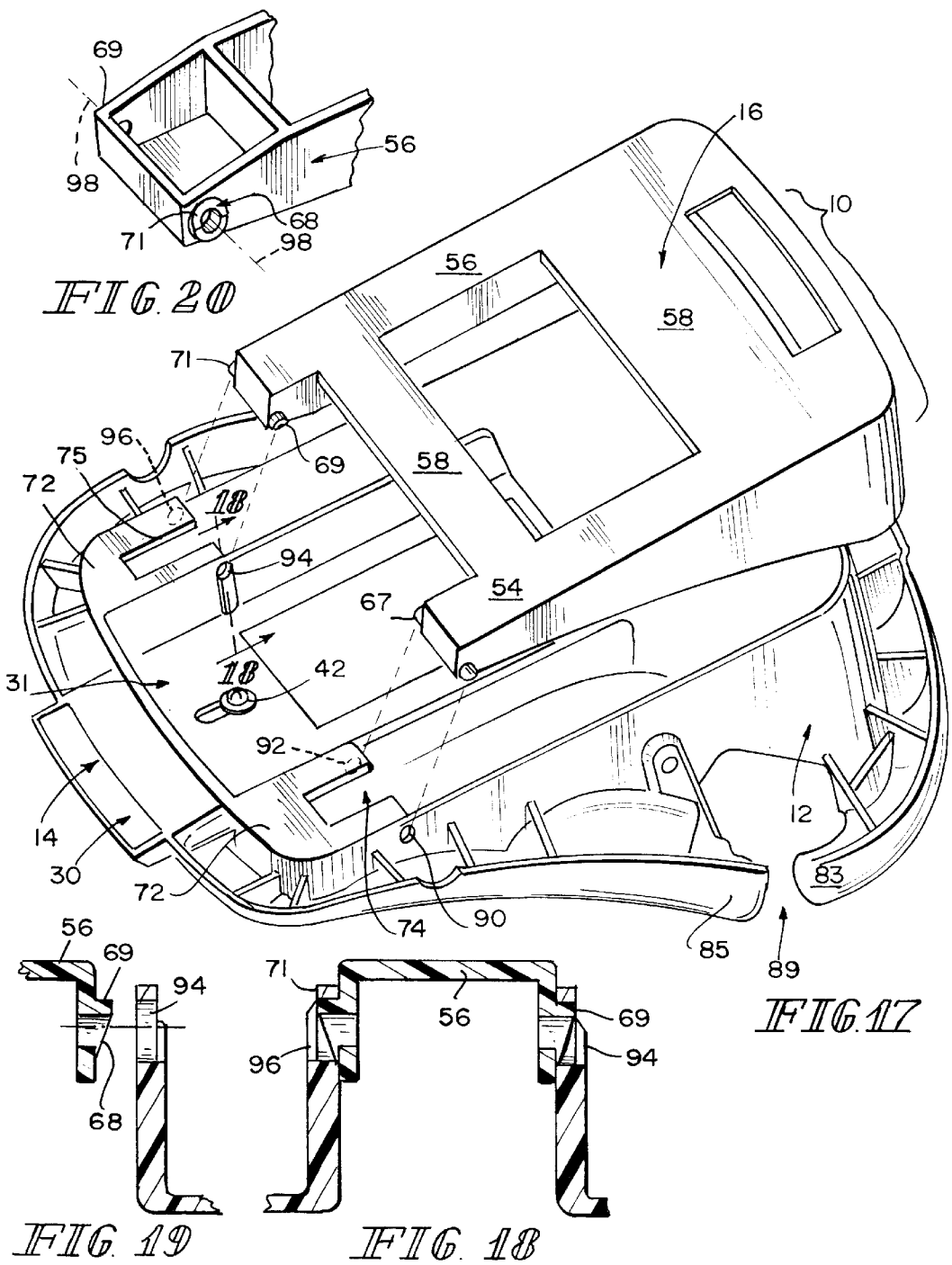

INFANT VEHICLE SEAT WITH TILTABLE BASE

This application claims priority under 35 U.S.C. 119(e) to U.S. Provisional Application Ser. No. 60/234,541, filed Sep. 22, 2000, which is expressly incorporated by reference herein.

BACKGROUND AND SUMMARY OF THE INVENTION

The present invention relates to a base for a juvenile seat, and particularly to a seat base that mounts and supports a juvenile seat on a seat in a vehicle. More particularly, the present invention relates to a seat base configured to tilt and adjust the tilt of the juvenile seat to the desired position regardless of the incline of the top surface of the seat in the vehicle.

Juvenile seats are widely accepted as necessary appliances for transporting young children in automobiles or other vehicles. Juvenile seats with detachable bases are known in the art. See, for example, U.S. Pat. No. 4,345,791 to Bryans et al., U.S. Pat. No. 4,634,177 to Meeker, U.S. Pat. No. 4,733,909 to Single II et al., U.S. Pat. No. 4,754,999 to Kain, U.S. Pat. No. 4,943,113 to Meeker, U.S. Pat. No. 5,277,472 to Freese et al., U.S. Pat. No. 5,413,401 to Koyanagi, U.S. Pat. No. 5,115,523 to Cone, U.S. Pat. No. 5,567,008 to Cone, II, U.S. Pat. No. 5,833,314 to Mitshelen et al., and U.S. Pat. No. 6,033,019 to Hession-Kunz, et al.

According to the present disclosure, an apparatus is provided for supporting a juvenile seat on a vehicle seat having a seat belt. The apparatus includes a juvenile seat having a seat bottom and a seat back, and a base that is adapted to receive the juvenile seat thereon. The base includes a support foundation adapted to lie on a vehicle seat, a seat support adapted to receive the seat bottom of the juvenile seat and mounted to move relative to the support foundation, and an actuator mounted to move between a locked position retaining the seat support in a fixed position relative to the support foundation and an unlocked position releasing the seat support for movement relative to the support foundation. The base further includes a front edge positioned to lie under the seat back, and the actuator includes a handle positioned to lie in an opening formed in the front edge of the base.

In preferred embodiments, an end opposite the handle end of the actuator cooperates with an anchor coupled to the support foundation to selectively permit pivotable movement of the seat support in relation to the support foundation about an axis near the front edge of the base.

Additional features of the disclosure will become apparent to those skilled in the art upon consideration of the following detailed description of preferred embodiments exemplifying the best mode of carrying out the disclosure as presently perceived.

BRIEF DESCRIPTION OF THE DRAWINGS

The detailed description particularly refers to the accompanying figures in which:

FIG. 15 is a sectional view of the tiltable base prior to engagement of the forked left end of the actuator with the anchor of the support foundation;

FIG. 16 is a sectional view of the tiltable base configured to support the juvenile seat in the desired position when the vehicle seat provides an inclined top surface such as that shown in FIG. 8;

FIG. 17 is a bottom perspective view of the tiltable base showing the pivot mounts of the support foundation and companion pivot mount-receiving apertures formed in the seat support;

FIG. 18 is a sectional view taken along the line 18—18 of FIG. 17 showing the placement of the pivot mounts in the apertures of the seat support;

FIG. 19 is a sectional exploded view similar to FIG. 18 showing the seat support aperture adapted to receive the pivot mount; and FIG. 20 is a bottom perspective view of a frame leg of the support foundation showing the orientation of the pivot mounts of FIGS. 17–19 and showing the pivot axis formed by the pivot mounts.

DETAILED DESCRIPTION OF THE DRAWINGS

Figure 1:
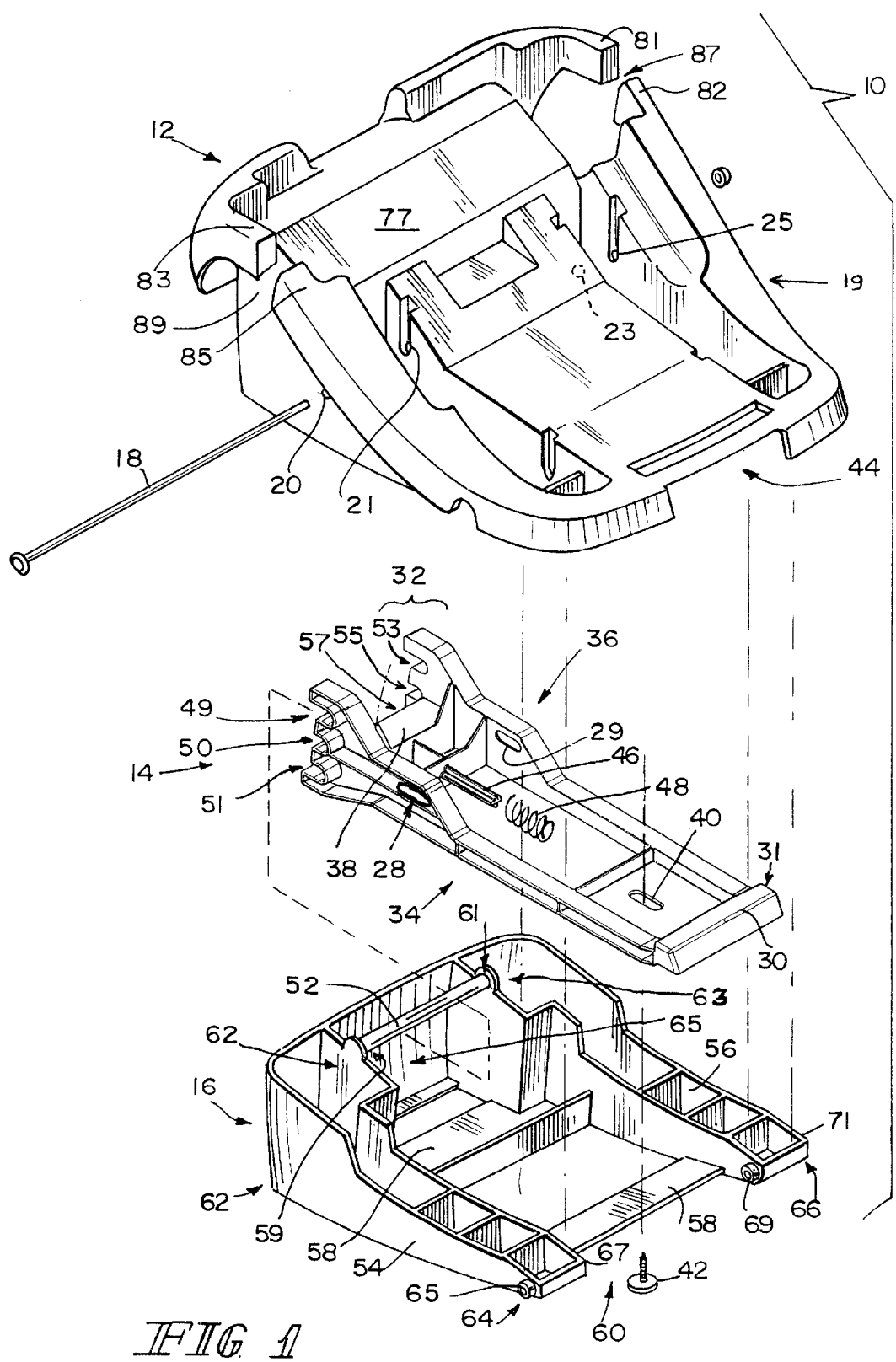
FIG. 1 is perspective assembly view of a tiltable base for supporting a juvenile seat in a desired position when the tiltable base is positioned on an underlying vehicle seat having an angle relative to a vertical line (as shown in FIGS. 6 and 8), the base including a seat support for coupling to the juvenile seat, a support foundation positioned to lie under the seat support and adapted to rest on a vehicle seat, and an actuator positioned to lie between the seat support and the support foundation and configured to provide for disengagement of an anchor included in the support foundation, thereby releasing the seat support for movement relative to the underlying support foundation and vehicle seat, and further configured to provide for engagement of the anchor to lock the seat support such that the juvenile seat is supported in the desired position.
Figures 2, 3:
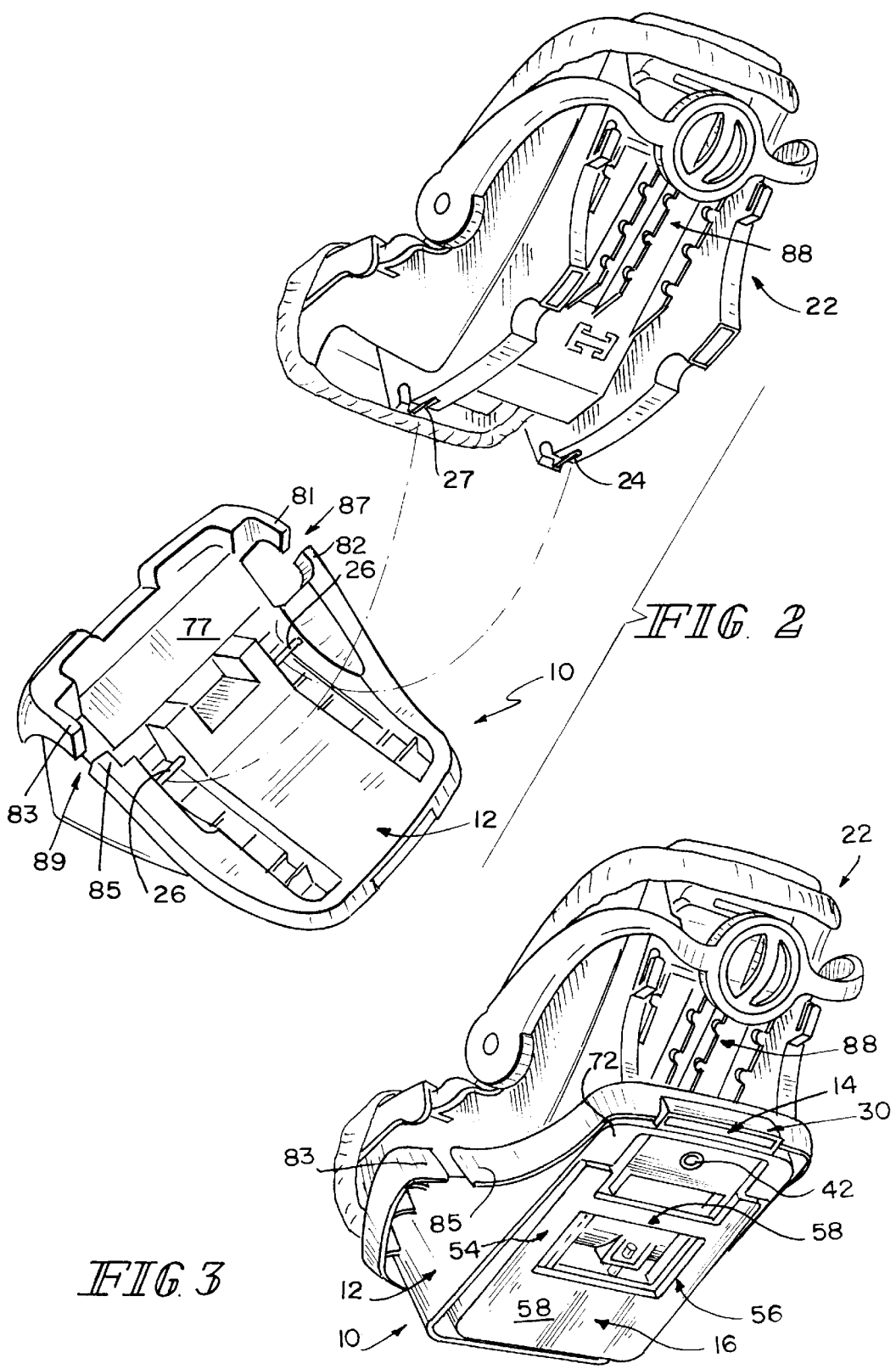
FIG. 2 is a perspective view of the juvenile seat and tiltable base showing the manner in which the base receives the rear-facing juvenile seat.
FIG. 3 is a bottom perspective view showing the juvenile seat mounted on the tiltable base, and the actuator positioned to lie beneath the seat back of the juvenile seat for convenient caregiver access to the actuator handle when the tiltable base and juvenile seat are mounted on a vehicle seat as shown in FIGS. 4 and 5.

A tiltable base 10 for supporting a juvenile seat in a desired position is shown in exploded view in FIG. 1 to include a seat support 12, an actuator 14, and a support foundation 16. A mounting rod 18 is inserted through mounting rod apertures 20, 21, 23, 25 formed in a shell 19 included in seat support 12 as suggested in FIG. 1 such that the juvenile seat 22 can be removably mounted to tiltable base 10 using clamps 24, 27 that engage with exposed portions 26 of mounting rod 18, as shown in FIGS. 2 and 3. Mounting rod 18 further passes through elongated-oval slot 28 of first-forked arm 34 of actuator 14, and elongated-oval slot 29 of second-forked arm 36 of actuator 14, thereby positioning the actuator 14 for sliding movement relative to shell 19 included in the seat support 12.

A tiltable base 10 for supporting a juvenile seat in a desired position is shown in exploded view in FIG. 1 to include a seat support 12, an actuator 14, and a support foundation 16. A mounting rod 18 is inserted through mounting rod apertures 20, 21, 23, 25 such that the juvenile seat 22 can be removably mounted to tiltable base 10 using clamps 24, 27 that engage with exposed portions 26 of mounting rod 18, as shown in FIGS. 2 and 3. Mounting rod 18 further passes through elongated-oval slot 28 of first-forked arm 34 of actuator 14, and elongated-oval slot 29 of second-forked arm 36 of actuator 14, thereby positioning the actuator 14 for sliding movement relative to the seat support 12.

Actuator 14 includes a handle end 31 having a handle 30, a forked end 32 opposite the handle 30, and a frame extending between handle 30 and forked end 32 as shown in FIG. 1. The frame includes first forked arm 34, second forked arm 36 in parallel relation to first forked arm 34, and a supportive web 38 disposed between first and second forked arms 34, 36 as suggested in FIG. 1. A retainer slot 40 is provided near handle 30 and cooperates with fastener 42 to retain actuator 14 in sliding relationship with seat support 12 so that handle 30 can be actuated through notch 44 provided in seat support 12, as shown, for example, in FIGS. 12–14. This disclosure is not limited to the provision of a forked end 32, however, and it should be understood that other embodiments for end 32 such as a slotted end or a grooved end are within the scope of the disclosure. It is similarly within the scope of the disclosure to have a single slot or groove in end 32 that cooperates with a plurality of anchors 52 to provide adjustable positioning of the tiltable base 10 relative to the seat support 12. While this embodiment is not shown, the functionality can be understood from the discussion below.

Figure 10:
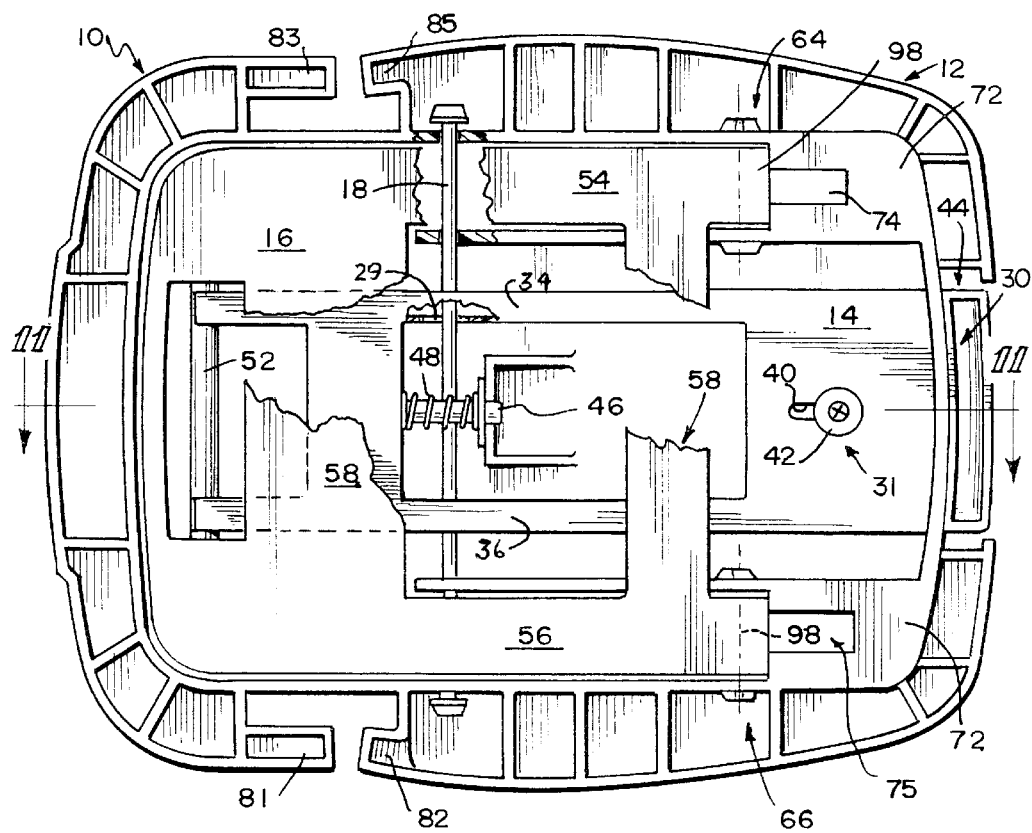
FIGS. 10 and 11 are bottom and side sectional views of the tiltable base in a lowered configuration for supporting the juvenile seat in a less inclined vehicle seat such as is shown in FIGS. 6 and 7, and showing the forked left end of the actuator engaging with the anchor included in the support foundation.
Figure 11:
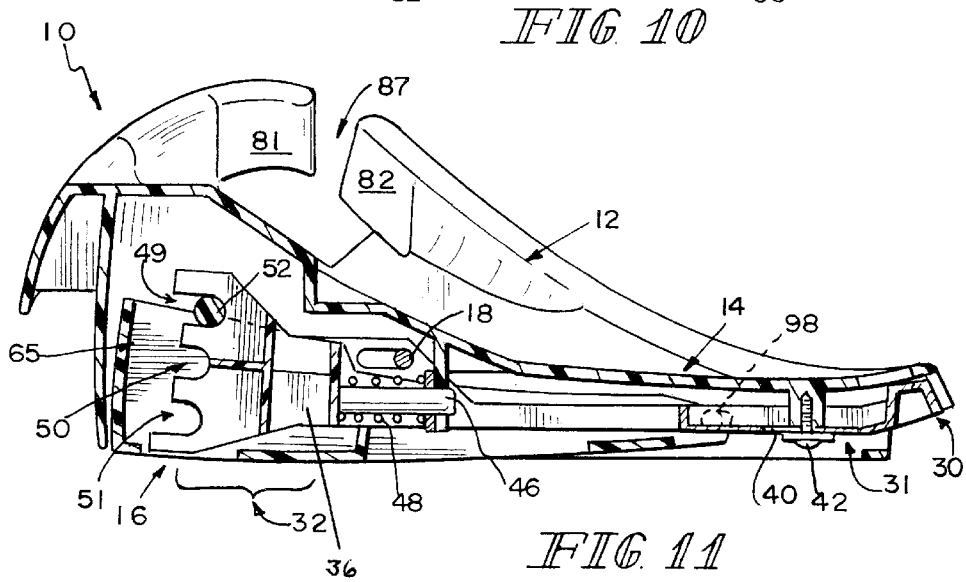
Figure 12:
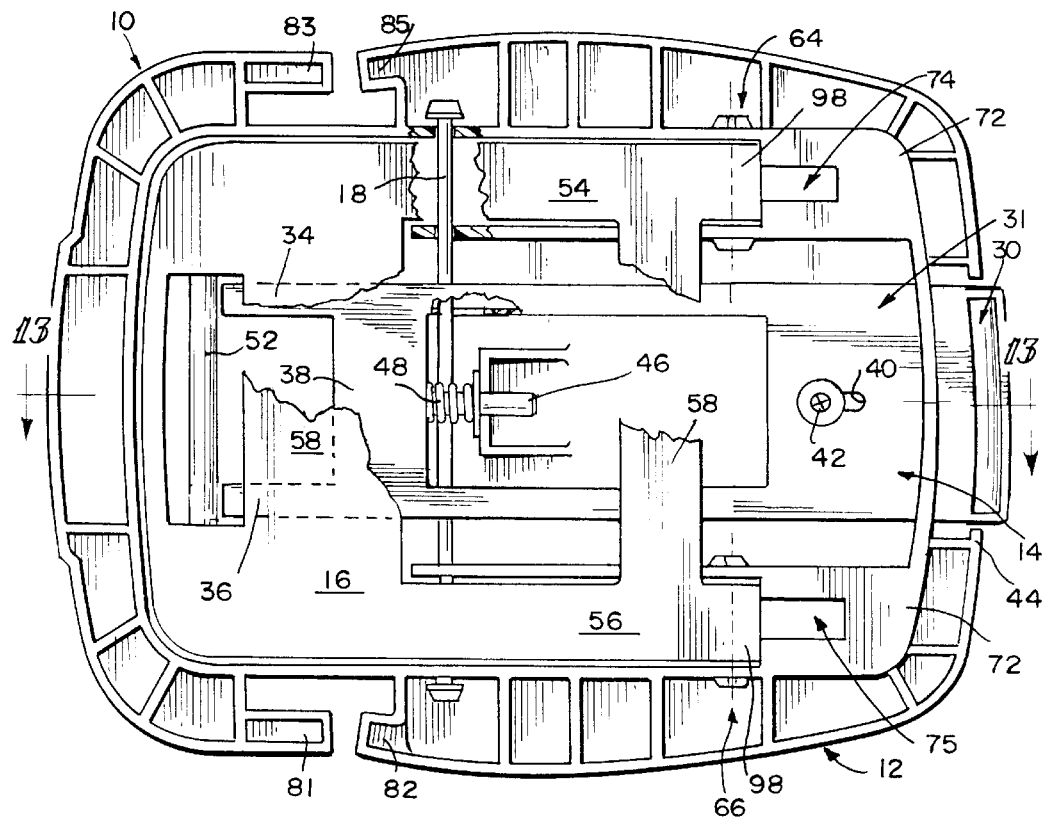
FIGS. 12 and 13 are bottom and side sectional views of the tiltable base of FIGS. 10 and 11 showing the actuator in an extended position away from the anchor such that the forked left end of the actuator is disengaged from the anchor.
Figure 13:
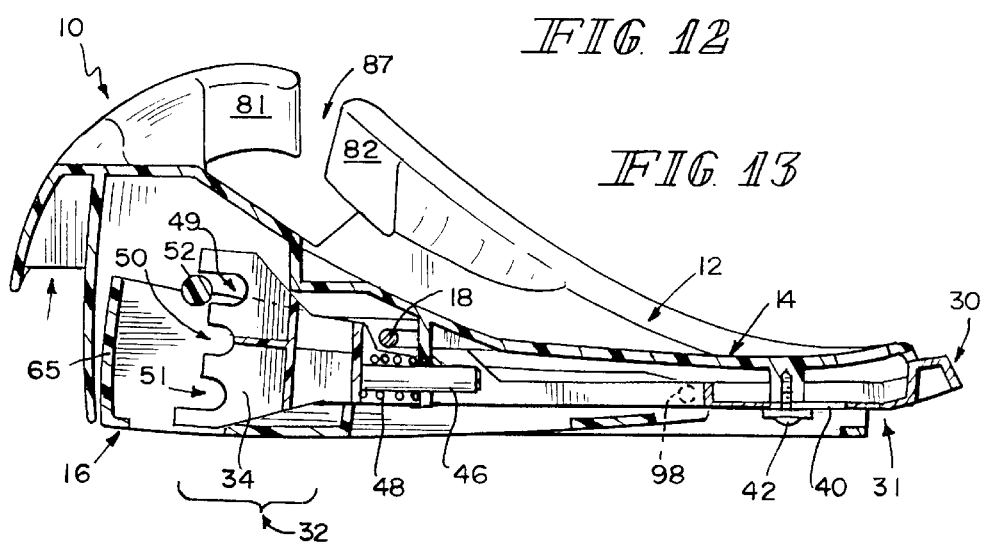
Figure 14:
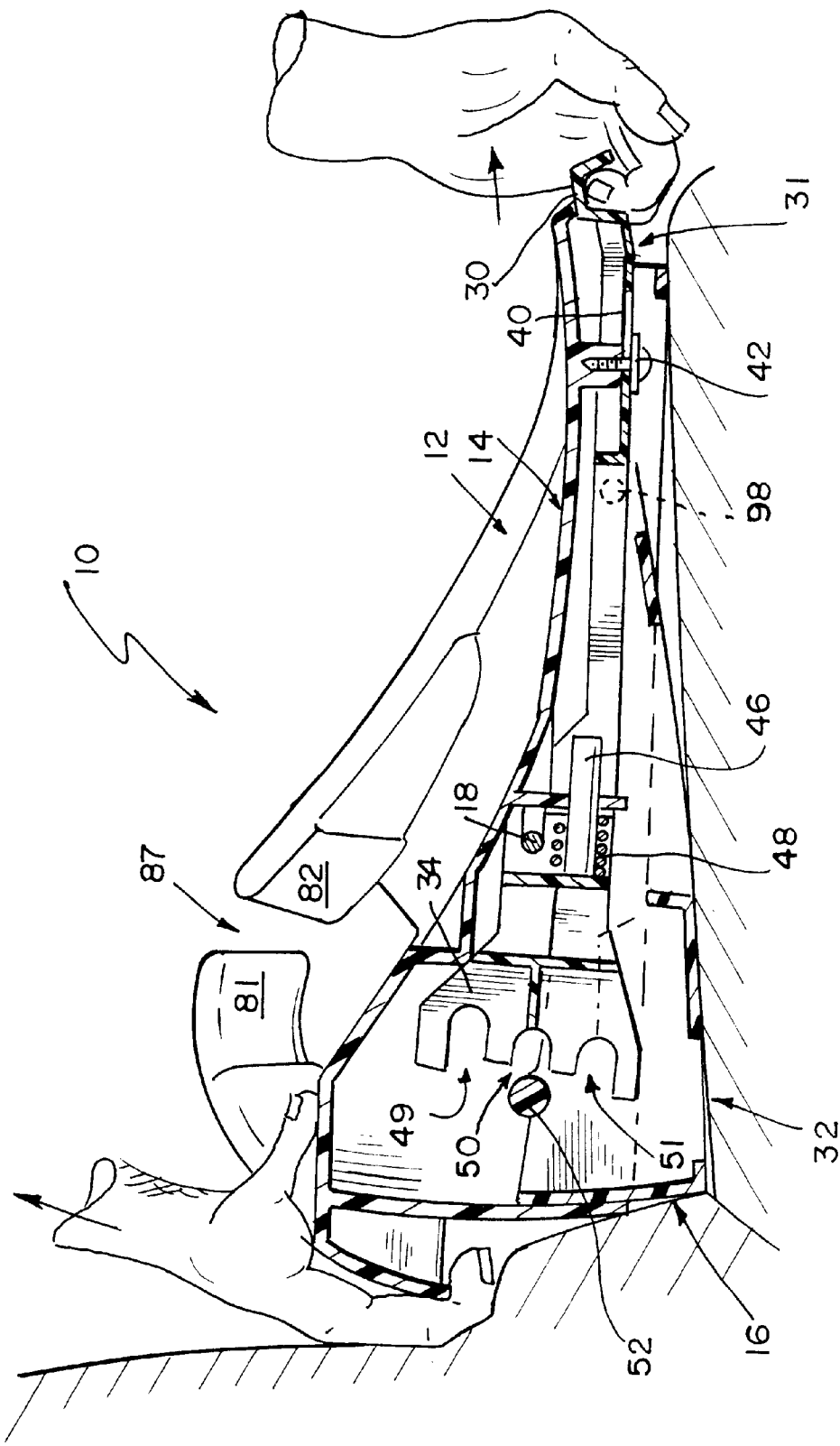
FIG. 14 is a sectional view of the tiltable base similar to that of FIG. 13, showing the base as it is being repositioned and the left end of the seat support as it is being moved upwardly relative to the left end of the support foundation to "tilt" the base and move the seat support to a position that will provide the desired position for the juvenile seat.

Actuator 14 further includes a post 46 carrying a spring 48 that cooperates with post 46 to bias actuator 14 in the non-extended (locked) position, shown in FIGS. 10 and 11. When actuator 14 is extended with actuation of handle 30, as shown in FIGS. 12–14, spring 48 is compressed thereby biasing actuator 14 to the non-extended (locked) position.

Forked end 32 of first forked arm 34 of actuator 14 provides recesses 49, 50, 51 (i.e. anchor receivers) for engaging anchor 52 coupled to the support foundation 16 in a selected position, to be described in more detail below, and as illustrated in FIGS. 1 and 10–16. Forked end 32 of second forked arm 36 provides recesses 53, 55, 57 (i.e. anchor receivers) for similarly engaging anchor 52. In the non-extended position, when handle 30 is not extended from the tiltable base 10, as shown in FIGS. 10, 11, and 16, one of recesses 49, 50, 51 associated with first forked arm 34 engages anchor 52 and one of recesses 53, 55, 57 associated with second forked arm 36 engages anchor 52 such that anchor 52 is locked in a fixed position relative to actuator 14. When handle 30 is withdrawn from tiltable base 10 to the extended (unlocked) position, as shown in FIGS. 12–15, actuator 14 and recesses 49, 50, 51, 53, 55, 57 are disengaged from anchor 52 thereby providing for movement of support foundation 16 relative to actuator 14. Selectable positioning of seat support 12 relative to support foundation 16 is described further below.

Support foundation 16 includes a pivot end 60 and a movable end 62, pivot end 60 including a first frame leg 54, a second frame leg 56, and a frame-supportive web 58 disposed between first and second frame legs 54, 56. Anchor 52 is supported by an anchor mount 63 at a first end 59 of anchor 52 and a second end 61 of anchor 52. Anchor mount 63 is formed at the pivot end 60 of first frame leg 54 and second frame leg 56, and is supported by frame-supportive web 58 and rear web 65, as shown for example in FIG. 1.

First and second pivot mounts 64, 66 are coupled at pivot end 60 of first and second frame legs 54, 56, respectively, as shown in FIGS. 1 and 17–20. First pivot mount 64 includes a first projection 65 and coaxial second projection 67 for insertion in coaxial apertures 90, 92, respectively, as shown in FIG. 17. Second pivot mount 66 also includes third projection 69 and fourth projection 71, the third and fourth projections 69, 71 being coaxial with the first and second projections 65, 67. Third projection 69 is adapted to mate with coaxial aperture 94, and fourth projection 71 is similarly adapted to mate with coaxial aperture 96. Coaxial apertures 90, 92, 94, and 96 are all substantially coaxial to provide a single pivot axis 98, as shown in FIGS. 10, 12 and 20.

Projections 65, 67, 69, 71 each includes a tapered surface 68, as shown in FIGS. 17–20, for facilitating insertion of projections 65, 67, 69, 71 into apertures 90, 92, 94, 96. Bottom surface 72 of seat support 12 also includes notches 74 proximal to pivot mounts 64, 66 for facilitating flexing of the seat support 12 when projections 65, 67, 69, 71 are inserted into apertures 90, 92, 94, 96.

Figure 4:
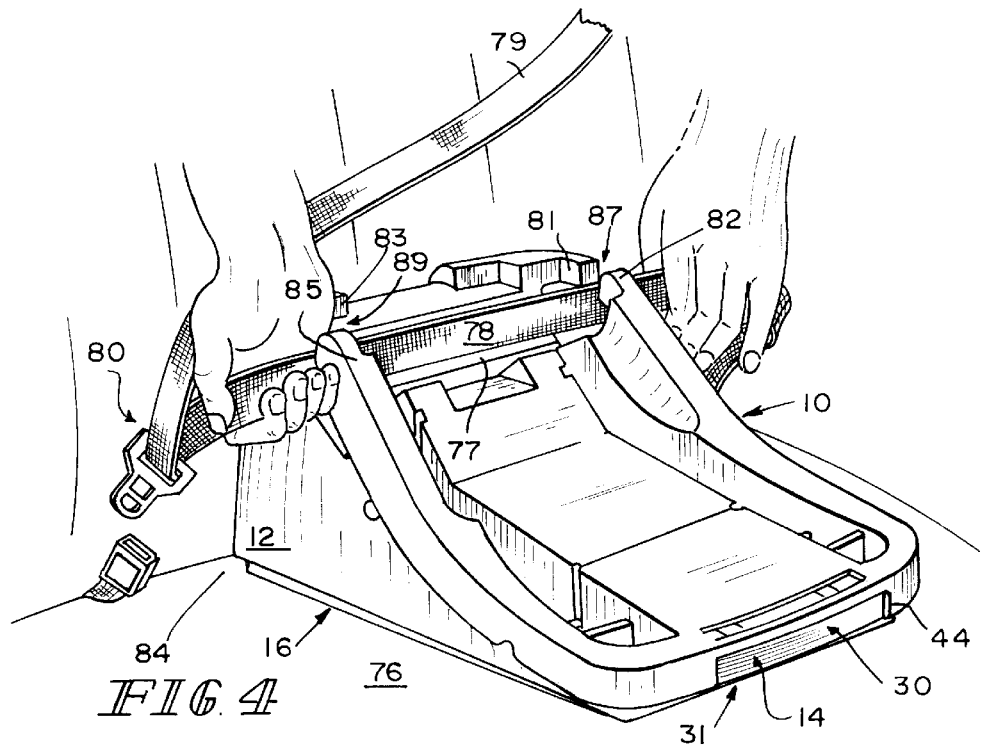
FIGS. 4 and 5 are perspective views showing one method used to mount the tiltable base on a vehicle seat using the vehicle lap belt prior to coupling the juvenile seat to the tiltable base.
Figure 5:
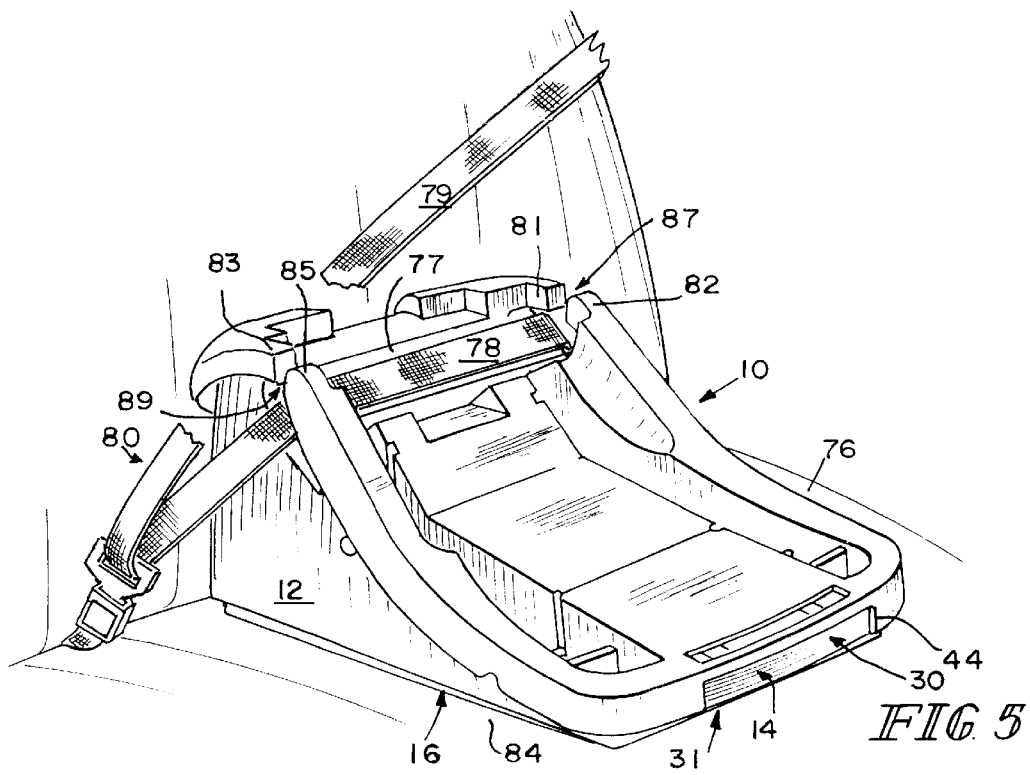
Figure 9:
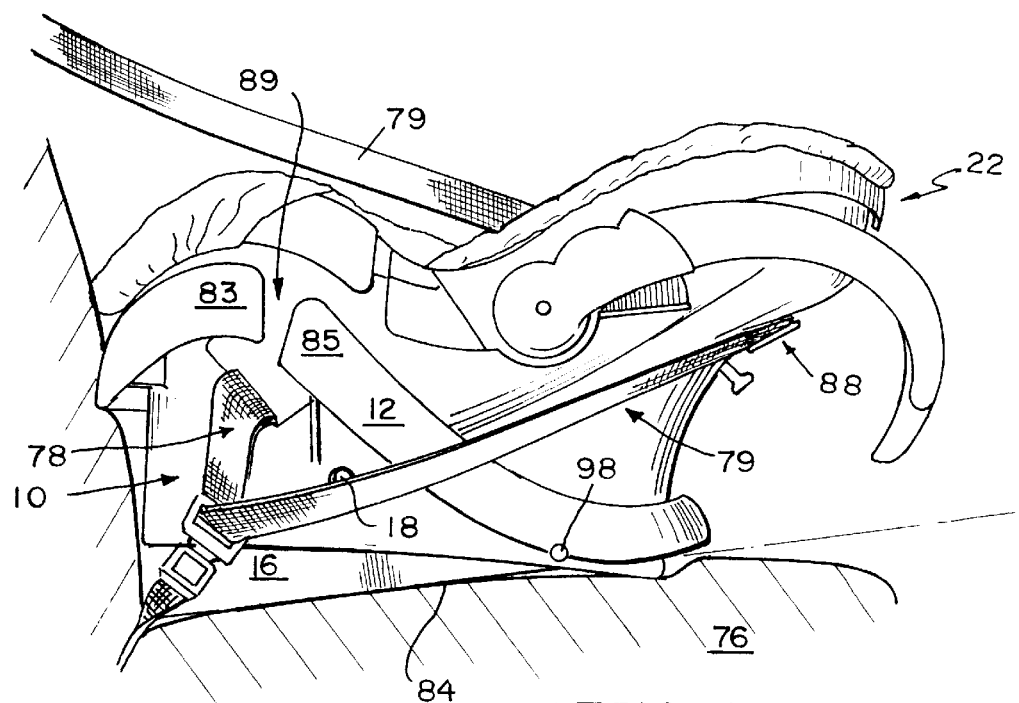
FIG. 9 is a side elevation view of the juvenile seat assembly secured in the vehicle seat of FIG. 8, showing the seat support tilted in relation to the underlying support foundation about a pivot axis under the seat back so that the juvenile seat can be moved relative to the tiltable base to position the juvenile seat in the desired position.

The juvenile seat 22 and tiltable base 10 cooperate to secure a juvenile in a car seat in substantially the following manner. Tiltable base 10 is placed on top of a vehicle seat 76, as shown in FIG. 4. Lap portion 78 of seat belt 80 is inserted between tabs 81, 82 which cooperate to provide a channel 87 therebetween. Lap portion 78 is also inserted between tabs 83, 85 which similarly cooperate to provide a channel 89 therebetween. After lap portion 78 is passed through channels 87, 89, it is positioned to lie on belt surface 77, such that lap portion 78 retains tiltable base 10 against vehicle seat 76, as shown in FIG. 5. Shoulder portion 79 of seat belt 80 can be positioned to wrap around seat back 88 as shown in FIGS. 7 and 9.

Figure 6:
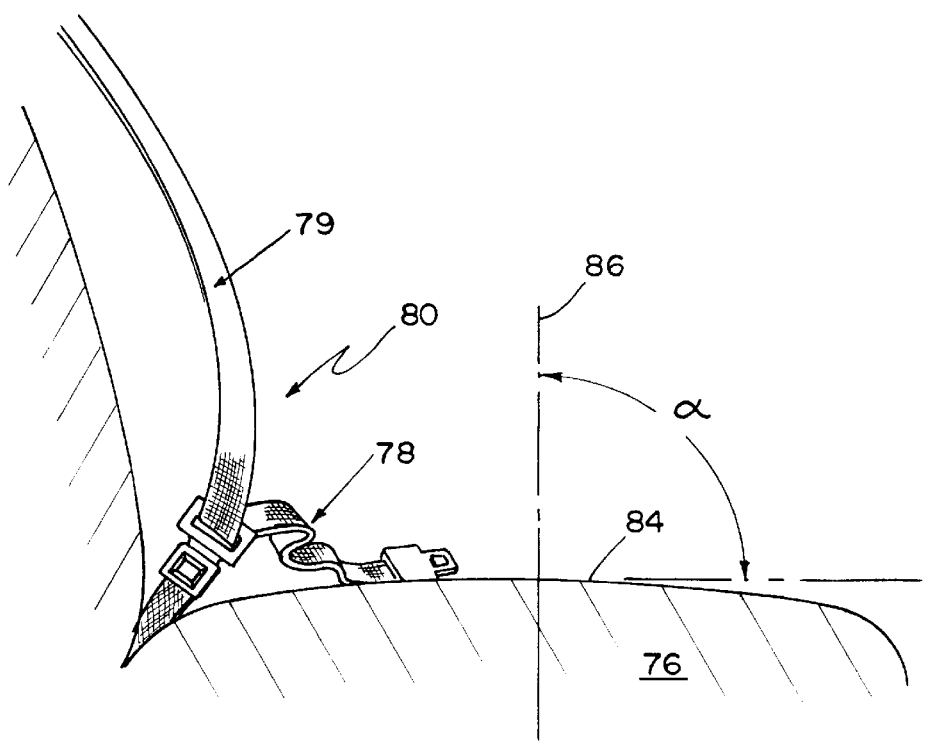
FIG. 6 is a side elevation view of a vehicle seat having a top surface forming an angle relative to the vertical line.
Figure 7:
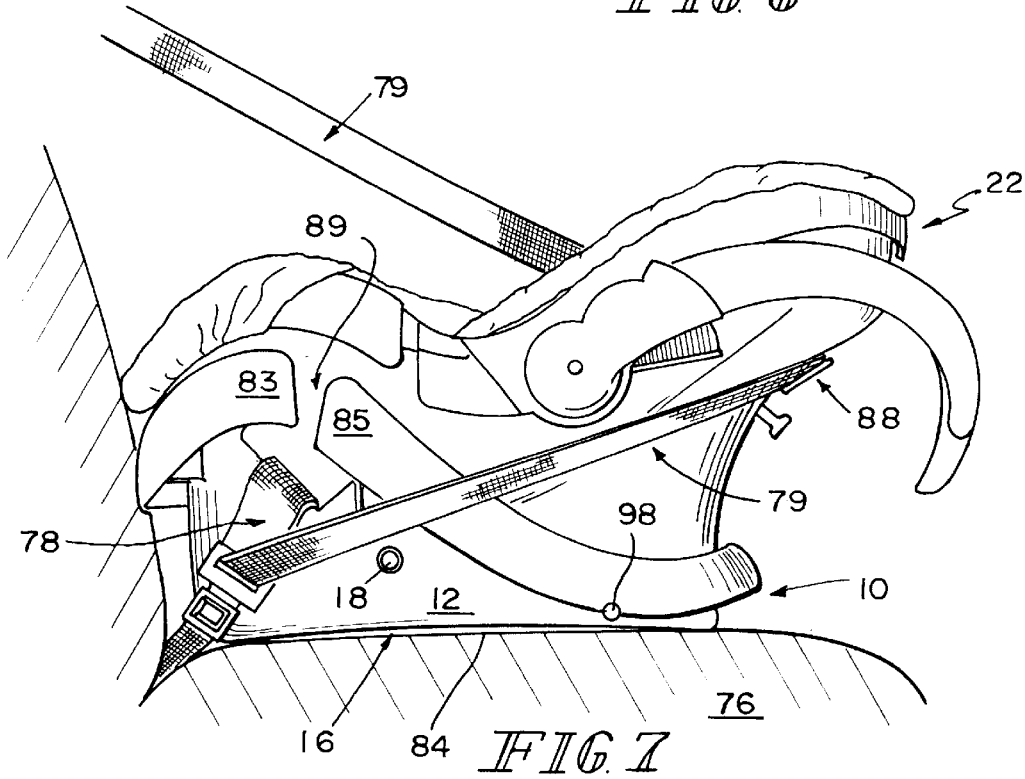
FIG. 7 is a side elevation view similar to that of FIG. 6 showing the juvenile seat assembly of FIG. 3 secured to the vehicle seat with the vehicle seat belt, and showing the placement of the seat support in a lowered position relative to the support foundation and adjacent to the vehicle seat to support the juvenile seat in the desired position.
Figure 8:
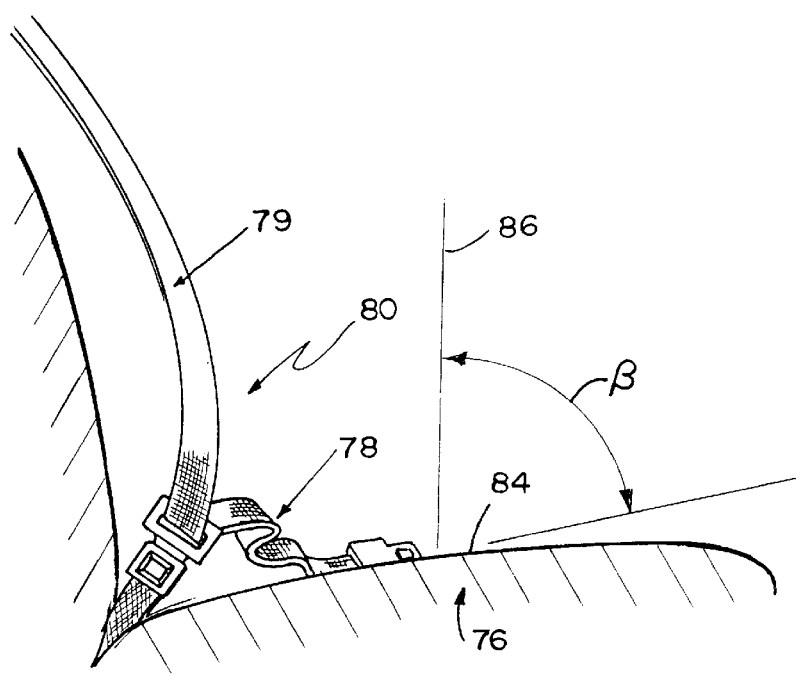
FIG. 8 is a side elevation view of a vehicle seat similar to that of FIG. 6, except that the vehicle seat is formed to provide a top surface at a different and smaller angle relate to the vertical line.

Vehicle seats in the industry vary in design, and may be designed to have a top surface 84 that is substantially perpendicular to a vertical line 86, as shown in FIG. 6, where α is approximately 90°, or vehicle seat 76 may have a top surface 84 that is at an acute angle β to a vertical line 86, as shown in FIG. 8. Regardless of the angle, a juvenile seat 22 preferably rests in the vehicle seat 76 such that the juvenile would be held in a desired position, as shown for example in FIGS. 7 and 9. The desired position may be determined by a level (not shown) included on the juvenile seat 22 which functions to indicate when the juvenile seat 22 is tilted to its predetermined safest position.

Once the tiltable base 10 is placed on the vehicle seat 76, tiltable base 10 can be arranged in the desired position by pulling handle 30 of the actuator 14, thereby disengaging forked ends 32 associated with first and second forked arms 34, 36 from anchor 52 and permitting pivotal movement of support foundation 16 relative to seat support 12 to selectable positions, as shown in FIGS. 10–16. While the pivot axis 98 for tiltable base 10 is disclosed to be located under seat back 88 of juvenile seat 22, the pivot axis 98 can suitably be located at any position near the front portion of the tiltable base 10 sufficient to allow for pivoting of the rear of the base such that the tilt of tiltable base 10 is adjustable. As used in this instance, "near" can be described as closer to the front portion of the tiltable base 10 than to the rear portion. For example, as suggested in the accompanying drawings, the pivot axis 98 can be located centrally between a center portion of the tiltable base 10 and the front portion.

FIGS. 10 and 11 illustrate actuator 14 engaged with anchor 52 so as to provide the lowered position of FIG. 7. In the lowered position, recess 49 of first forked arm 34 engages anchor 52, and recess 53 of second forked arm 36 engages anchor 52 such that anchor 52 is locked in a fixed position relative to the actuator 14.

FIGS. 12 and 13 illustrate the actuator 14 disengaged from the anchor 52 and ready to be moved from the lowered position. FIG. 14 shows anchor 52 positioned proximal to recesses 50 and 55 (not shown). To accomplish an intermediate position, handle 30 would be released to allow recesses 50 and 55 to engage anchor 52. This disclosure is not limited to the provision of three positions, however, and any number of intermediate positions between a lowered position and a raised position is within the scope of the disclosure.

Support foundation 16 can be further moved relative to seat support 12 to a raised position as shown in FIG. 15, wherein anchor 52 engages recesses 51 and 57 (not shown). Upon release of handle 30, forked end 32 of actuator 14 engages anchor 52 with bias from spring 48, as illustrated in FIG. 16. Other positions can be provided between the lowered position of FIG. 11 and the raised position of FIG. 16 by the formation of additional recesses in first and second forked arms 34, 36.

By positioning the handle 30 beneath the seat back 88 of the juvenile seat 22 and near the pivot axis 98 of the tiltable base 10, as shown in FIG. 3, the handle can be accessed by a caregiver even when the tiltable base 10 is secured to the vehicle seat 76 and the juvenile seat 22 is mounted to the tiltable base 10. This access allows adjustments to the level of the tiltable base 10 to be made easily and without removing juvenile seat 22 from base 10.

It is also within the scope of the disclosure to position the handle on a side of the tiltable base 10, or in any other location on the tiltable base 10 where a caregiver can access the actuator 14 without the removal of juvenile seat 22 from the tiltable base 10 or without repositioning tiltable base 10 on vehicle seat 76.

In another embodiment, the invention can be described as a method of positioning a juvenile seat to lie in a desired position regardless of the angle of inclination of a vehicle seat underlying the juvenile seat. The method includes the step of providing a base that has a support foundation adapted to lie on the vehicle seat and a seat support configured to be coupled to the juvenile seat. An actuator is provided for releasing the support foundation from a fixed position relative to the seat support, wherein the actuator is positioned relative to the seat support and support foundation so that the actuator can be actuated when the juvenile seat is coupled to the base and the base is mounted on the vehicle seat. A seat support can then be moved relative to the support foundation so that the juvenile seat is in a desired position. Finally, the actuator can be secured so that the support foundation is in the fixed position relative to the seat support.

Although the invention has been described in detail with reference to certain preferred embodiments, variations and modifications exist within the scope and spirit of the invention as described and defined in the following claims.

What is claimed is:

1. An apparatus comprising
   a juvenile seat including a seat bottom and a seat back and
   a base to be coupled to the juvenile seat, the base having a front edge positioned to lie directly under the seat back, the base comprising:
   a support foundation adapted to set on a vehicle seat,
   a seat support to be coupled to the juvenile seat and mounted to move relative to the support foundation to establish a position of the juvenile seat relative to the support foundation, and
   an actuator mounted to move between a locked position retaining the seat support in a fixed position relative to the support foundation and an unlocked position releasing the seat support for movement relative to the support foundation, the actuator being positioned to be actuated from the front edge of the base.

2. The apparatus of claim 1, wherein the front edge of the base provides an opening, and the actuator includes a handle positioned to lie in the opening.

3. The apparatus of claim 1, wherein the support foundation includes a frame having an anchor support and an anchor carried by the anchor support, the frame having first and second legs extending transversely from the anchor support.

4. The apparatus of claim 3, wherein a first pivot mount is coupled to the first frame leg and a second pivot mount is coupled to the second frame leg, the first and second pivot mounts cooperate to provide a pivot axis about which there is relative movement between the seat support and support foundation.

5. The apparatus of claim 4, wherein the anchor has an axis substantially parallel to the pivot axis.

6. The apparatus of claim 3, wherein the anchor is positioned to lie between the first and second frame legs.

7. The apparatus of claim 3, wherein the actuator includes an end configured selectively to engage the anchor so as to provide the locked position when the end is engaged with the anchor and the unlocked position when the end is disengaged with the anchor.

8. The apparatus of claim 7, wherein the end of the actuator includes a first forked arm and a second forked arm in spaced relation to the first forked arm, the first and second forked arms cooperating selectively to engage and disengage the anchor.

9. The apparatus of claim 7, wherein the end provides a plurality of notches for selective engagement of the anchor with one of the notches.

10. The apparatus of claim 1, wherein the relative movement between the seat support and the support foundation is pivotal about an axis near the front edge of the base.

11. The apparatus of claim 1, wherein a spring is coupled to the actuator for biasing the actuator in the locked position.

12. The apparatus of claim 1, wherein the seat support includes a mounting rod for mounting the seat to the seat support and the actuator includes a slot formed to accommodate the mounting rod and provide a sliding relationship between the actuator and the seat support.

13. The apparatus of claim 1, wherein the actuator can be operated when the juvenile seat is coupled to the seat support and when the juvenile seat is decoupled from the seat support.

14. An apparatus for retaining a juvenile in a vehicle seat, the apparatus comprising
a juvenile seat,
a seat support having a rear portion adapted to rest against a vehicle seat back and a front portion opposite the rear portion, the seat support being adapted to receive the juvenile seat thereon and to pivot relative to the support foundation about an axis substantially at the front portion of the seat support,
a support foundation pivotally coupled to the seat support and adapted to lie on a vehicle seat, and
an actuator coupled to the seat support, the actuator accessible from the front portion of the seat support and movable between a locked position and an unlocked position to provide movement of the seat support relative to the support foundation.

15. The apparatus of claim 14, wherein the support foundation includes an anchor and the actuator includes a plurality of notches for selectively receiving the anchor.

16. The apparatus of claim 15, wherein the actuator is engaged with the anchor in the locked position and the actuator is disengaged from the anchor in the unlocked position.

17. The apparatus of claim 14, wherein the actuator includes a handle for selectively positioning the actuator in one of the locked position and the unlocked position.

18. The apparatus of claim 17, wherein the handle is positioned to lie in an opening formed in the front portion of the seat support.

19. The apparatus of claim 14, further comprising a spring for biasing the actuator in the engaged position.

20. The apparatus of claim 14, wherein the actuator can be operated when the juvenile seat is received on the seat support.

21. A seat mount for a juvenile seat, the seat mount comprising
a seat support having a rear portion adapted to rest against a vehicle seat back,
a support foundation coupled to the seat support to pivot relative to the seat support about an axis positioned substantially at a front portion of the seat support, and
means for permitting adjustable movement of the support foundation relative to the seat support to establish a position of the juvenile seat relative to the support foundation so that the juvenile seat is oriented to lie in a desired position regardless of the inclination of the vehicle seat underlying the support foundation, wherein the permitting means is accessible to a caregiver when the juvenile seat is coupled to the seat support and the seat support is mounted on the vehicle seat and further wherein the moving means is actuated from a front portion of the seat support.

22. The seat mount of claim 21, wherein the moving means includes an anchor coupled to the support foundation and an actuator, the actuator and the anchor cooperating to provide a locked position when the actuator is engaged with the anchor and an unlocked position when the actuator is disengaged with the anchor.

23. The seat mount of claim 22, wherein the anchor is a rod and the actuator includes an end having a plurality of notches adapted to engage the rod in a selected one of the notches.

24. The seat mount of claim 22, wherein the actuator includes a handle for moving the actuator between the locked position and the unlocked position.

25. The seat mount of claim 22, wherein the moving means includes a spring for biasing the moving means in the locked position.

26. An apparatus comprising
a juvenile seat and
a base under the juvenile seat,
the base including a support foundation adapted to set on a vehicle seat and formed to include an anchor, a seat support coupled to the juvenile seat and mounted for movement relative to the support foundation in a region above the seat foundation and below the juvenile seat, and an actuator mounted for movement relative to the seat support to engage the anchor to block further movement of the seat support relative to the support foundation to establish a position of the juvenile seat relative to the support foundation, wherein the actuator includes a grip handle positioned to lie at a first end of the base and the anchor is positioned to lie at an opposite second end of the base.

27. The apparatus of claim 26, wherein the actuator further includes a frame arranged to extend under the Juvenile seat from the first end of the base to the second end of the base, the grip handle is coupled to a first end of the frame, and an anchor receiver is coupled to an opposite second end of the frame and arranged to engage and disengage the anchor in response to movement of the actuator relative to the juvenile seat.

28. The apparatus of claim 27, wherein the anchor receiver is formed to include a series of spaced-apart anchor-receiving slots, each anchor-receiving slot corresponds to a distinct inclined position of the seat support relative to the support foundation, and the anchor is sized to fit into one of the anchoring receiving slots upon movement of the seat support about a pivot axis relative to the support foundation to establish an inclined position of the seat support and juvenile seat coupled thereto relative to the support foundation.

29. The apparatus of claim 28, wherein the pivot axis is arranged to extend through the first end of the base and lie in perpendicular relation to the frame of the actuator.

30. The apparatus of claim 28, wherein the anchor is defined by an elongated rod arranged to lie in spaced-apart parallel relation to the pivot axis, the frame includes a pair of laterally spaced-apart forked arms, a first of the forked arms includes a forked end configured to define the anchor receiver and arranged to engage a left-side portion of the elongated rod, and a second of the forked arms includes a forked end configured to define another anchor receiver and arranged to engage a right-side portion of the elongated rod.

31. The apparatus of claim 27, wherein the seat support includes a shell and a mounting rod coupled to the shell and coupled to the juvenile seat, the frame is formed to include at least one oblong slot, and the mounting rod is arranged to extend through the at least one oblong slot to limit movement of the actuator relative to the seat support as the actuator moves between a locked position wherein the anchor receiver engages the anchor to retain the scat support in a fixed position relative to the support foundation and an unlocked position wherein the anchor receiver disengages the anchor to release the seat support for movement relative to the support foundation.

32. The apparatus of claim 31, wherein the mounting rod includes two spaced-apart exposed portions coupled to the juvenile seat and a covered portion located under the shell and between the two spaced-apart exposed portions and the covered portion is arranged to extend through the at least one oblong slot formed in the frame.

33. The apparatus of claim 27, wherein the actuator is mounted for movement between a locked position wherein the anchor receiver engages the anchor to retain the seat support in a fixed position relative to the support foundation and an unlocked position wherein the anchor receiver disengages the anchor to release the seat support for movement relative to the support foundation and the actuator further includes a spring located between the anchor receiver and the grip handle and arranged to engage the frame and the seat support to bias the actuate toward the locked position.

34. The apparatus of claim 33, wherein the frame includes a post carrying the spring and extending into a post receiver formed in the seat support to cause one end of the spring to engage the frame and an opposite end of the spring to engage the seat support.

35. The apparatus of claim 26, wherein the juvenile seat includes a seat bottom coupled to the seat support and a seat back arranged to extend away from the seat bottom and overlie the first end of the base and the grip handle provided at the first end of the base.

36. The apparatus of claim 35, wherein the seat support is formed to include a notch providing an opening in the first end of the base under the seat back and the grip handle is positioned to lie in the notch.

37. The apparatus of claim 36, wherein the actuator further includes a frame mounted for movement relative to the seat support and a spring carried on the frame and arranged to engage the seat support normally to bias the frame to move toward the second end of the base to cause an anchor receiver coupled to a second end of the frame to engage the anchor to establish a fixed position of the seat support and the juvenile seat coupled thereto relative to the support foundation and to cause the grip handle coupled to an opposite first end of the frame to lie in the notch formed in the seat support.

38. The apparatus of claim 35, wherein the seat support is mounted to the support foundation to pivot about a pivot axis arranged to lie under the seat back.

39. The apparatus of claim 38, wherein the support foundation includes a movable end carrying the anchor and cooperating with the seat support to establish the second end of the base and a pivot end lying under the seat back and cooperating with the seat support to establish the first end of the base.

40. The apparatus of claim 39, wherein the pivot end of the support foundation includes a first pivot mount coupled to the seat support along the pivot axis and a second pivot mount located in spaced-apart relation to the first pivot mount to locate the grip handle therebetween and coupled to the seat support along the pivot axis.

41. The apparatus of claim 26, wherein a pivot end of the seat support is coupled to a pivot end of the support foundation at a pivot axis established at the first end of the base to allow pivotable movement of the seat support relative to the support foundation about the pivot axis.

42. The apparatus of claim 41, wherein the seat support is formed to include a notch providing an opening in the first end of the base and the grip handle is positioned to lie in the notch.

43. The apparatus of claim 42, wherein the actuator further includes a frame mounted for movement relative to the seat support and a spring carried on the frame and arranged to engage the seat support normally to bias the frame to move toward the second end of the base to cause an anchor receiver coupled to a second end of the frame to engage the anchor to establish a fixed position of the seat support and the juvenile seat coupled thereto relative to the support foundation and to cause the grip handle coupled to an opposite first end of the frame to lie in the notch formed in the seat support.

44. The apparatus of claim 41, wherein the pivot end of the support foundation includes a first pivot mount coupled to the seat support along the pivot axis and a second pivot mount located in spaced-apart relation to the first pivot mount to locate the grip handle therebetween and coupled to the seat support along the pivot axis wherein the actuator includes a grip handle positioned to lie at a fir anchor is positioned to lie at an opposite second end of the base.

* * * * *